Dec. 20, 1949            T. SPIERER            2,491,781
COLD CATHODE TUBE VOLTAGE INDICATOR
Filed Oct. 25, 1945
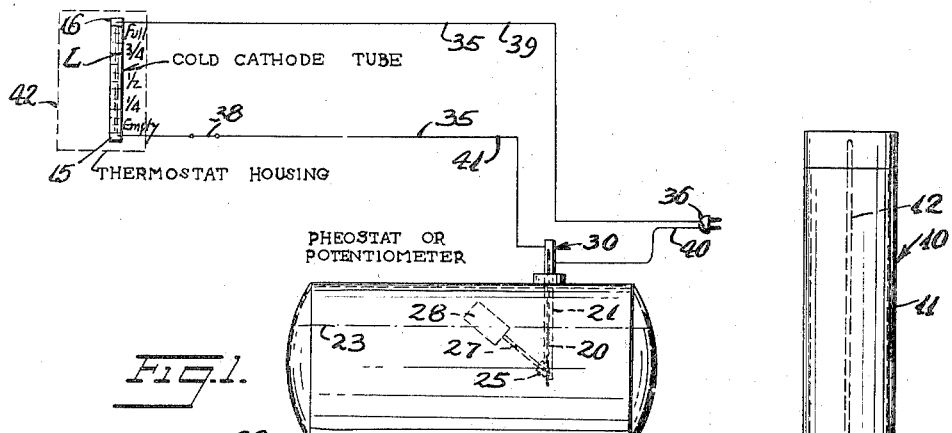
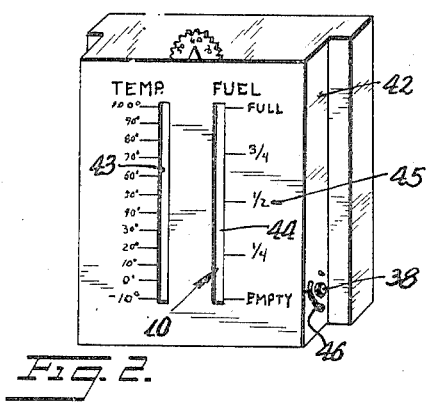
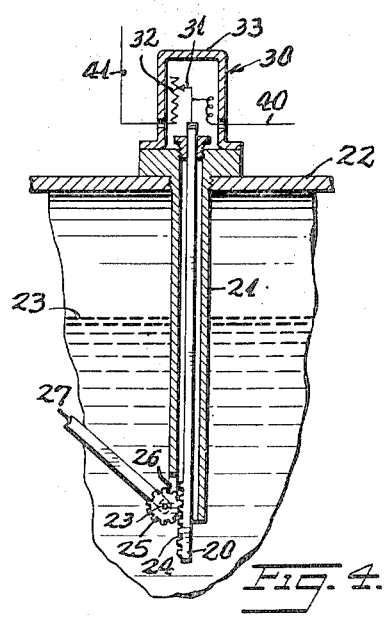
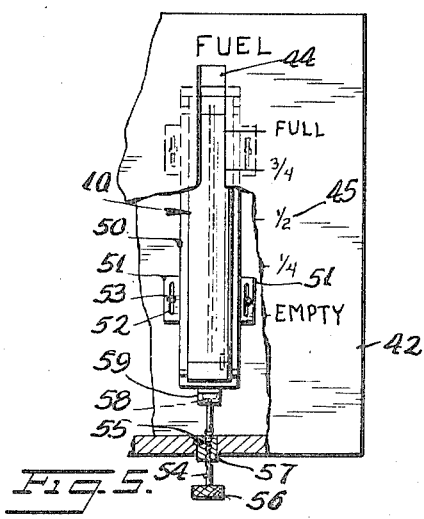
INVENTOR
THEODORE SPIERER
BY
ATTORNEY Patented Dec. 20, 1949

2,491,781

UNITED STATES PATENT OFFICE 2,491,781

COLD CATHODE TUBE VOLTAGE INDICATOR

Theodore Spierer, Brooklyn, N. Y., assignor to Edi Holding Inc., Brooklyn, N. Y., a corporation of New York Application October 25, 1945, Serial No. 624,361

4 Claims. (Cl. 171—95)

This invention relates to new and useful improvements in an electronic metering device.

More particularly the invention proposes an improved electronic metering device which is particularly intended to indicate the level of liquids in tanks by means of a beam of light.

More specifically, the new and improved metering device is characterized by a cold cathode tube having a transparent envelope through which a long cathode of the tube is visible. It is proposed to connect this tube in series with a rheostat, or potentiometer. It is proposed to associate this rheostat, or potentiometer with means for varying its resistance in proportion to the level of liquid in a tank or other container to be metered. It is proposed to arrange a scale along said long cathode which is graduated to indicate the level of the substance in the tank. Either A. C. or D. C. current may be used for operating the metering device. The beam of light on the cathode will indicate the height of the substance in the tank.

It is proposed that the cathode tube be located either at the tank or at a remote point. Preferably it should be at a remote point, since the beam of light from the cathode tube may be utilized for many purposes. A practical application of the new electronic metering device would be to indicate how much oil is in a tank in a home, or other place. In this case, the cathode tube would be located upstairs so as to eliminate the necessity of the going down in the basement to check the oil supply.

The invention contemplates the utilization of the light from the cathode tube for other purposes besides indicating the level of the liquid or other substance in the tank. For example, it may be used as a night light, in the hall, or a room of the house. When the night light becomes dim attention is immediately called to the fact that the liquid in the tank is running low. The beam of light can also be used to illuminate the thermometer usually found in the customary thermostat housing of a thermostat used to control the heat in a home or other place.

Still further the invention proposes a new and improved electronic metering device, as briefly explained, which is exceptionally simple, which is cheap to manufacture, reliable in operation and which may be sold at a low cost.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Figure 1 is an elevational view of an electronic metering device constructed in accordance with this invention and applied to an installation, the electric wiring being schematically illustrated.

Figure 2 is a perspective view of the thermostat housing with a thermometer and provided with a cathode tube, in accordance with this invention.

Figure 3 is an elevational view of the cathode tube, illustrated per se.

Figure 4 is a fragmentary enlarged vertical sectional view through a portion of the tank shown in Figure 1.

Figure 5 is a fragmentary enlarged detailed view of a thermostat housing provided with a cold cathode tube, in accordance with a modified form of this invention.

The new and improved electronic metering device in accordance with this invention makes use of a cold cathode tube 10 having transparent glass envelope 11 through which a long cathode 12 of the tube is visible. The tube 10 is provided with an anode 14 located at the bottom.

This anode 14 is connected with a bottom terminal 15. If desired, the terminal 15 may extend completely over and cover the anode 14 from view. The cathode 12 connects with a top terminal. The envelope 11 is filled with a customary gas, for instance neon, which would produce a red beam of light surrounding the cathode wire 12 during the operation of the device. The cathode 12 may or may not be coated with chemicals to cause fluorescence of various colors, and also, for the purpose of causing the cathode tube to start conduction at a lower voltage.

A metering rod 20 is slidably mounted through a tubular member 21 which is mounted through the top of the tank 22 containing a liquid 23 which is to be metered. The metering rod 20 has rack teeth 24 which mesh with a pinion 25 rotatably supported by a pintle mounted upon the bottom portion of the tubular member 21. The tubular member 21 is formed with a slot 26 through which the pinion 25 projects. An arm 27 is fixedly connected with the pintle 26 to turn the pintle and in turn the pinion 25. A float 28 is mounted upon the free end of the arm 27 and is floated by the liquid 23.

The metering rod 20 is connected with and controls a rheostat 30. This rheostat 30 includes a moveable contact arm 31 insulated from and mounted on the top end of the metering rod 20. This contact arm 31 is capable of moving along a resistance winding 32. The rheostat 30 has a casing 33 containing and covering the winding 32 and the contact arm 31. An electric circuit 35 connects the rheostat 30 and the cathode tube 10 in series with a source of electrical current. This circuit 35 includes a conventional electric plug 36 by which it may be connected with a household or other source of alternating electric current. The electric circuit 35 includes a switch 38 by which the circuit may be opened and closed. The circuit 35 may be traced by noting that one lead 39 thereof connects with one of the terminals of the electric plug 36 and with the terminal 16 of the cathode tube 10. A lead 40 connects the other terminal of the electric plug 36 with the movable contact arm 31. The bottom end of the resistance winding 32 is connected by a lead 41 with the bottom terminal 15 of the cathode tube 10.

In the particular installation illustrated in Figs. 1 to 4 inclusive, the cathode tube 10 is mounted within the usual thermostat housing 42 for the thermostat used in homes to control the heating system. The housing 42 is also provided with a thermometer 43. The housing 42 has a vertical slot 44 behind which the cathode tube 10 is supported. A scale 45 is imprinted upon the housing 42 along the length of the slot 44 and indicates the liquid level in the tank 22. This scale 45 is calibrated to indicate "full," "¾ full," "½ full," "¼ full" and "empty." The switch 38 is also mounted on the housing 42. Preferably the switch 38 should be a push button switch. The latch 46 is mounted on the housing 42 for holding the push button switch 38 closed when this is desired.

The operation of this form of the invention may be understood from the following:

As the liquid 23 is consumed its level falls. The float 28 descends, and through the arm 27, turns the pinion 25 which moves the metering rod 20 upward. The contact arm 31 moves upward adding resistance from the winding 32 into the circuit 35. Less current is therefore applied to the cathode tube 10. This indicates the receding liquid level.

More particularly, it is a fact that the length of the glow on the cathode area of a cold cathode tube is purely a function of the current that the tube is conducting. The more current, the longer will be the glow. The glow area starts immediately adjacent to the anode 14 and increases in length upwards along the length of the cathode 12. On A. C. operation the anode 14 as well as the cathode 12 will glow. However, since the anode 14 is occluded, only the cathode 12 can be seen. By the use of a rectifier the glow upon the anode 14 may be eliminated. If D. C. power is used the cathode 12 will glow, while the anode 14 is not affected. The amount of current needed to light the cathode 12 is merely a few milliamperes which makes for very economical operation.

With the particular design illustrated, when the tank 22 is empty, maximum resistance from the resistance 32 will be connected in the circuit 35, reducing the current through the cathode tube 10 to a minimum, so that the glow upon the cathode 12 is at its minimum indicating that the tank 22 is empty. When the tank 22 is full, the contact arm 31 will be down and entirely cut out the resistance 32, so that the cathode tube 10 is receiving the full current and the beam of light will now extend along the entire height of the cathode 12 indicating a full tank 22.

The switch 38 may be controlled so that normally the cathode tube 10 does not receive current. When it is desired to inspect the thermometer 43, or the cathode tube 10, it is merely necessary to close the switch 38. Now the cathode tube 10 will glow indicating the liquid level in the tank 22. The glow will also illuminate the thermometer 43 which may be then more easily read. The cathode tube 10 may also be used as a night light. To do this the switch 38 is closed and the latch 46 is moved to hold it in its closed position. Now the cathode tube 10 works continuously. When it becomes dim, it is immediately known that the liquid level in the tank 22 is low.

The height of the glow is schematically indicated in Figure 1 by the horizontal hatching lines L.

In Figure 5 another embodiment of the invention has been disclosed which merely differs from the prior form of the invention in the mounting of the cathode tube 10. In this form, the cathode tube 10 is mounted on an adjustable bracket 50. This bracket 50 has several lugs 51 formed with vertically arranged elongated slots 52 through which supporting pins 53 pass. The bracket 50 is supported by an adjustment screw 54. The adjustment screw 54 threadedly engages through a bushing 55 fixedly mounted through the bottom wall of the housing 42. The screw 54 has a bottom knob 56 by which it may be turned. A lock nut 57 is mounted on the screw 54 to prevent it from accidentally losing its adjustment. The top end of the screw 54 has a head 58 which is rotative within a member 59 attached to the bottom of the bracket 50. When the screw 54 is turned, it moves upwardly or downwardly, correspondingly moving the bracket 50 and moving the cathode tube 10.

The scale 45 is imprinted upon the housing 42. By moving the cathode tube 10, it is possible to adjust the metering device for more practical use. For example, it is possible to make it indicate "empty" when the tank is really not empty. With this arrangement the tendency of a party allowing the tank to empty entirely is reduced. The exact point where it is desired to read "empty" may be set for anyone's particular taste.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letter Patent is:

1. An indicator for use with a device for measuring liquid levels, comprising a hollow housing having a rear wall, a bottom wall and a front wall formed with a vertical slot, a scale formed on the front face of said front wall alongside said slot, a bracket for a cathode tube within said housing immediately behind said slot, a cathode tube supported in said bracket to be viewed through said slot, means vertically slidably supporting said bracket on said back wall, and means operable through said bottom wall for holding said bracket in a desired adjusted position to adjust the position of said cathode tube with relation to said slot and said scale, said slidable supporting means comprising lugs extended laterally from the sides of said bracket and formed with vertically arranged elongated slots, and supporting pins extending from said rear wall and slidably passing through said slots.

2. An indicator for use with a device for measuring liquid levels, comprising a hollow housing having a rear wall, a bottom wall and a front wall formed with a vertical slot, a scale formed on the front face of said front wall alongside said slot, a bracket for a cathode tube within said housing immediately behind said slot, a cathode tube supported in said bracket to be viewed through said slot, means vertically slidably supporting said bracket on said back wall, and means operable through said bottom wall for holding said bracket in a desired adjusted position to adjust the position of said cathode tube with relation to said slot and said scale, said holding means comprising an internally threaded bushing fixedly mounted through said bottom wall beneath said bracket, an adjustment screw threadedly engaged through said bushing, and a head formed on the end of said screw within said housing and turnably connected with the bottom of said bracket, so that turning said screw in one direction or the other will move said bracket up or down to similarly move said cathode tube.

3. An indicator for use with a device for measuring liquid levels, comprising a hollow housing having a rear wall, a bottom wall and a front wall formed with a vertical slot, a scale formed on the front face of said front wall alongside said slot, a bracket for a cathode tube within said housing immediately behind said slot, a cathode tube supported in said bracket to be viewed through said slot, means vertically slidably supporting said bracket on said back wall, and means operable through said bottom wall for holding said bracket in a desired adjusted position to adjust the position of said cathode tube with relation to said slot and said scale, said holding means comprising an internally threaded bushing fixedly mounted through said bottom wall beneath said bracket, an adjustment screw threadedly engaged through said bushing, and a head formed on the end of said screw within said housing and turnably connected with the bottom of said bracket, so that turning said screw in one direction or the other will move said bracket up or down to similarly move said cathode tube, and a lock nut threadedly mounted on said screw to be tightened against said bushing for securing said adjustment screw in position.

4. An indicator comprising a hollow housing having a rear wall, a bottom wall and a front wall formed with a vertical slot, a scale formed on the front face of said front wall alongside said slot, a bracket for a cathode tube within said housing immediately behind said slot, a cathode tube supported in said bracket to be viewed through said slot and connected in series in an operating circuit, lugs extended laterally from the sides of said bracket and formed with vertically arranged elongated slots, supporting pins extending from said rear wall and passing through said slots for vertically slidably supporting said bracket on said rear wall, an internally threaded bushing fixedly mounted through said bottom wall beneath said bracket, an adjustment screw threadedly engaged through said bushing, and a head formed on the end of said screw within said housing and turnably connected with the bottom of said bracket, so that turning said screw in one direction or the other will move said bracket up or down to similarly move said cathode tube and adjust the position of the latter with relation to said slot and said scale.

THEODORE SPIERER.

REFERENCES CITED

The following references are of record in the file of this patent:

UNITED STATES PATENTS

| Number | Name | Date |
|---|---|---|
| 505,243 | Bristol | Sept. 19, 1893 |
| 612,518 | Herbener | Oct. 18, 1898 |
| 1,406,312 | Wessoleck | Feb. 14, 1922 |
| 1,424,637 | Gallaude | Aug. 1, 1922 |
| 1,753,330 | Bragg | Apr. 8, 1930 |
| 1,867,216 | Forney | July 12, 1932 |
| 2,013,012 | Tauschek | Sept. 3, 1935 |
| 2,141,236 | Benedict | Dec. 27, 1938 |
| 2,161,744 | McCarty | June 6, 1939 |
| 2,269,760 | Eldredge | Jan. 13, 1942 |